(12) United States Patent
Urano

(10) Patent No.: US 8,669,678 B2
(45) Date of Patent: Mar. 11, 2014

(54) WIRELESS POWER FEEDER, WIRELESS POWER RECEIVER, AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 234 days.

(21) Appl. No.: 13/273,723

(22) Filed: Oct. 14, 2011

(65) Prior Publication Data
US 2012/0212068 A1    Aug. 23, 2012

Related U.S. Application Data

(60) Provisional application No. 61/445,193, filed on Feb. 22, 2011.

(51) Int. Cl.
*H01F 27/42* (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| | | | | |
|---|---|---|---|---|
| 6,670,796 B2 * | 12/2003 | Mori | ............................. | 323/282 |
| 7,741,734 B2 | 6/2010 | Joannopoulos et al. | | |
| 2008/0278264 A1 | 11/2008 | Karalis et al. | | |
| 2009/0015075 A1 | 1/2009 | Cook et al. | | |
| 2009/0072629 A1 | 3/2009 | Cook et al. | | |
| 2010/0033023 A1 * | 2/2010 | Baarman | ........................ | 307/104 |
| 2010/0244581 A1 * | 9/2010 | Uchida | ........................... | 307/104 |
| 2011/0127846 A1 * | 6/2011 | Urano | ............................ | 307/104 |

FOREIGN PATENT DOCUMENTS

JP    A-2010-022076    1/2010

OTHER PUBLICATIONS

International Preliminary Report on Patentability dated Sep. 19, 2013 issued in PCT/JP2012/054166.

* cited by examiner

*Primary Examiner* — Rexford Barnie
*Assistant Examiner* — Joseph Inge
(74) *Attorney, Agent, or Firm* — Oliff PLC

(57) ABSTRACT

A wireless power feeder which performs power feed by a non-contact method to a wireless power receiver having a power receive coil, this wireless power feeder having a power feed coil; and a control circuit having a phase delay device which generates a delayed AC voltage where the phase of the output AC voltage is delayed; a magnetic sensor biased by the delayed AC voltage and detects a magnetic field generated by power receive coil; phase detection circuits which generate phase difference instruction voltages corresponding to a phase difference between an output voltage from the magnetic sensor and a comparison voltage, on the basis of the output voltage and the comparison voltage; and AC current generation circuits which generate the output AC voltage having a frequency based on the phase difference instruction voltage, and generate the AC current having a frequency corresponding to the frequency of the output AC voltage.

18 Claims, 11 Drawing Sheets

WIRELESS POWER FEEDER, WIRELESS POWER RECEIVER, AND WIRELESS POWER TRANSMISSION SYSTEM

CROSS REFERENCE TO RELATED APPLICATION

This application claims priority to U.S. Provisional Application No. 61/445,193 filed on Feb. 22, 2011 by the same Applicant, which is hereby incorporated by reference in its entirety.

BACKGROUND OF THE INVENTION

1. Field of the Invention

The present invention relates to a wireless power feeder, a wireless power receiver, and a wireless power transmission system for transmitting power by a non-contact method.

2. Related Background Art

Japanese Patent Application Publication No. 2010-22076 discloses a non-contact power transmission apparatus (wireless power transmission system) which performs power transmission by a non-contact method from a primary side coil (power feed coil) to a secondary side coil (power receive coil) using an electromagnetic induction, which is one type of magnetic coupling (electromagnetic coupling). In this non-contact power transmission apparatus, a primary side coil is driven by AC voltage on the basis of the output of a oscillation circuit. The oscillation circuit is a variable-frequency oscillation circuit of which the oscillation frequency can be varied. This non-contact power transmission apparatus detects an input power supplied from a power source to the primary side coil, finds the oscillation frequency at which the input power becomes a maximum, and operates the oscillation circuit at that oscillation frequency. By this means, decline in the power transmission efficiency due to component variation or positional deviation of the coils is avoided, and the transmission efficiency can be improved.

More specifically, the non-contact power transmission apparatus disclosed in Japanese Patent Application Publication No. 2010-22076 comprises a voltage detection circuit for detecting an input voltage, a current detection circuit for detecting an input current, and a multiplication circuit for calculating the product of the output of the voltage detection circuit and the output of the current detection circuit.

SUMMARY OF THE INVENTION

However, in the non-contact power transmission apparatus disclosed in Japanese Patent Application Publication No. 2010-22076, there is a problem in that there is an increase in the number of components, such as peak hold circuits for the voltage detection circuit and the current detection circuit, and the multiplication circuit, and the like, and the control circuit and system becomes complicated.

Therefore, it is an object of the present invention to provide a wireless power feeder, a wireless power receiver and a wireless power transmission system capable of performing efficient power transmission, without using a control circuit having a complicated composition.

The present inventors and others discovered that, when there is divergence in the distance between the power feed coil and the power receive coil, or in the central positions of these coils, the mutual inductance changes and this causes the frequency of the AC current flowing in the power receive coil to diverge from the frequency of the AC current flowing in the power feed coil, and consequently, the power transmission efficiency declines. The present inventors propose that, in order to suppress decline in the power transmission efficiency, the frequency of the AC current of the power feed coil follows the frequency of the AC current in the power receive coil which has changed.

The wireless power feeder according to the present invention is a wireless power feeder which performs power feed by a non-contact method to a wireless power receiver having a power receive coil; the wireless power feeder comprising: a power feed coil; and a control circuit which performs power feed from the power feed coil to the power receive coil on the basis of magnetic coupling between the power feed coil and the power receive coil, by supplying AC current to the power feed coil, and which associates a frequency of the AC current with a frequency of current flowing in the power receive coil. The control circuit has: a phase delay circuit which generates a delayed AC voltage in which the phase of an output AC voltage is delayed; a magnetic sensor which is biased by the delayed AC voltage and detects a magnetic field generated by the power receive coil; a phase detection circuit which generates a phase difference instruction voltage corresponding to a phase difference between an output voltage from the magnetic sensor and a comparison voltage, on the basis of the output voltage and the comparison voltage; and an AC current generation circuit which generates the output AC voltage having a frequency based on the phase difference instruction voltage, and generates the AC current having a frequency corresponding to the frequency of the output AC voltage.

For example, "associates a frequency of the AC current with a frequency of the current flowing in the power receive coil" means that the frequency of the AC current is made to coincide substantially with the frequency of the current flowing in the power receive coil. Even if the frequency of the AC current and the frequency of the current flowing in the power receive coil are not completely matching, it is still possible to perform highly efficient power transmission, provided that these frequencies are substantially matching within a range of error of about ±20%, for example. For example, "associates a frequency of the AC current with a frequency of the current flowing in the power receive coil" also includes cases where the frequency of the AC current is made to coincide substantially with the frequency of the current flowing in the power receive coil within a range of error of about ±20%.

According to this wireless power feeder, the phase delay circuit and the magnetic sensor in the control circuit function as a so-called AND circuit, and an AND calculation of the magnetic field produced by the power receive coil (in other words, the current flowing in the power receive coil) and the delayed AC voltage (in other words, the output AC voltage of the voltage-controlled oscillator) is carried out. A phase difference instruction voltage which corresponds to the phase difference between the current flowing in the power receive coil and the output AC voltage of the AC current generating circuit is generated by this AND circuit and the phase detection circuit. Consequently, it is possible to associate the frequency of the output AC voltage of the AC current generating circuit (in other words, the frequency of the AC current supplied to the power feed coil), with the frequency of the current flowing in the power receive coil, by feedback control of these circuits and the AC current generating circuit.

In this way, according to the wireless power feeder, it is possible to make the frequency of the AC current supplied to the power feed coil follow the frequency of the current flowing in the power receive coil at all times, just by using a simple control circuit composition constituted by a phase delay circuit, a magnetic sensor, a phase detection circuit, and an AC current generating circuit. Therefore, even if there is deviation in the distance between the power feed coil and the power receive coil, or the center positions of the power feed coil and the power receive coil, it is still possible to achieve efficient power transmission at all times.

The phase delay circuit generates a delayed AC voltage in which the phase of the output AC voltage is delayed by less than 360° and not less than 30°.

The magnetic sensor may be arranged such that a non-sensing direction forms an angle in a range of ±10° with respect to a magnetic field vector (lines of magnetic force) generated by the power feed coil. By this means, the magnetic sensor is able to detect the magnetic field produced by the power receive coil accurately, without detecting unwanted magnetic field from the power feed coil.

Furthermore, the wireless power feeder may comprise a magnetic shield member having an approximate U shape in cross-section, which magnetically shields the five surfaces of the magnetic sensor apart from the power receive coil side opposing surface that opposes the power receive coil, namely, the power feed coil side opposing surface which opposes the power feed coil and the four side faces which intersect with the power receive coil side opposing surface and the power feed coil side opposing surface. By this means, the unwanted magnetic field from the power feed coil is shielded and the magnetic sensor is able to detect accurately the magnetic field produced by the power receive coil.

The control circuit may further have a plurality of magnetic sensors and an adder which adds up output signals from the plurality of magnetic sensors; and
the phase detection circuit may generate a phase difference instruction voltage corresponding to a phase difference between an output voltage from the adder and a comparison voltage, on the basis of the output voltage and the comparison voltage.

According to this composition, even if there is divergence between the central positions of the power feed coil and the power receive coil, it is still possible to detect the magnetic field produced by the power receive coil (the current flowing in the power receive coil) efficiently. In other words, it is possible to detect the magnetic field produced by the power receive coil (the current flowing in the power receive coil) efficiently, not only when the central winding axis of the power feed coil and the central winding axis of the power receive coil coincide with each other (when the power receive coil is positioned directly over the power feed coil) and the power feed coil and the power receive coil are parallel with each other, but also when the power receive coil is displaced obliquely with respect to the power feed coil (when the coils are displaced relatively in the horizontal direction and are also non-parallel).

The phase detection circuit described above may include: a comparator which compares the output voltage from the magnetic sensor with the comparison voltage and generates a pulse voltage having a pulse width corresponding to the phase difference between the output voltage and the comparison voltage; and a low-pass filter which generates the phase difference instruction voltage by smoothing the pulse voltage.

The AC current generation circuit described above may have a voltage-controlled oscillator which generates the output AC voltage having a frequency based on the phase difference instruction voltage, and a high-frequency amplifier which generates the AC current having a frequency corresponding to the frequency of the output AC voltage.

The wireless power transmission system according to the present invention is a wireless power transmission which performs power transmission by a non-contact method between the wireless power feeder and the wireless power receiver described above, wherein power transmission is performed from the power feed coil to the power receive coil on the basis of magnetic coupling between the power feed coil in the wireless power feeder and the power receive coil in the wireless power receiver.

According to this wireless power transmission system, since power is acquired by a non-contact method from the wireless power feeder described above, it is possible to make the frequency of the AC current supplied to the power feed coil follow the frequency of the current flowing in the power receive coil at all times, just by using a simple control circuit composition. Therefore, even if there is deviation in the distance between the power feed coil and the power receive coil, or the center positions of the power feed coil and the power receive coil, it is still possible to achieve efficient power transmission at all times.

A further wireless power feeder according to the present invention is a wireless power feeder which performs power feed by a non-contact method to a wireless power receiver having a power receive resonance circuit including a power receive coil and a power receive capacitor, the wireless power feeder further having: a power feed resonance circuit, including the power feed coil and a power feed capacitor and performing power feed from the power feed coil to the power receive coil on the basis of a magnetic field resonance effect between the power feed coil and the power receive coil. The resonance frequency of the power feed resonance circuit is associated with the resonance frequency of the power receive resonance circuit, and the control circuit described above associates the frequency of the AC current with the frequency of the resonance current of the power receive resonance circuit.

Here, the "magnetic field resonance effect between the power feed coil and the power receive coil" means a resonance effect of the power receive resonance circuit based on an AC magnetic field which is produced by the power feed coil. This magnetic field resonance effect is also one type of magnetic coupling (electromagnetic coupling). When an AC current is supplied to the power feed coil, an AC magnetic field is produced by the power feed coil. By this means, the power feed coil and the power receive coil are magnetically coupled, and the power receive resonance circuit resonates. In this case, if the frequency of the AC current is associated with the resonance frequency of the power receive resonance circuit (in other words, the frequency of the current flowing in the power receive coil), a power factor of 1 for the transmitted power is achieved, and it is possible to perform highly efficient power transmission.

For example, "the frequency of the AC current and the resonance frequency of the power receive resonance circuit are associated" means that the frequency of the AC current and the resonance frequency of the power receive resonance circuit are substantially matching. Even if the frequency of the AC current and the resonance frequency of the power receive resonance circuit are not completely matching, it is still possible to raise the power factor of the transmitted power provided that these frequencies are substantially matching within a range of error of about ±20%, for example, and therefore highly efficient power transmission can be achieved. Accordingly, "the frequency of the AC current and the resonance frequency of the power receive resonance circuit are associated" includes cases where the frequency of the AC current and the resonance frequency of the power receive resonance circuit are substantially matching within a range of error of about ±20%.

Furthermore, for example, "the resonance frequency of the power feed resonance circuit is associated with the resonance frequency of the power receive resonance circuit" means that the resonance frequency of the power feed resonance circuit substantially coincides with the resonance frequency of the power receive resonance circuit. Even if the resonance frequency of the power feed resonance circuit and the resonance frequency of the power receive resonance circuit are not completely matching, it is still possible to perform highly efficient power transmission, provided that these frequencies are substantially matching within a range of error of about ±20%, for example. Accordingly, "the resonance frequency of the power feed resonance circuit is associated with the resonance frequency of the power receive resonance circuit" includes cases where the resonance frequency of the power feed resonance circuit substantially coincides with the resonance frequency of the power receive resonance circuit within a range of error of about ±20%.

In this further wireless power feeder, it is possible to make the frequency of the AC current supplied to the power feed coil follow the resonance frequency of the power receive resonance circuit, just by using a simple control circuit composition. Therefore, even if there is deviation in the distance between the power feed coil and the power receive coil, or the center positions of the power feed coil and the power receive coil, it is still possible to achieve efficient power transmission at all times.

Yet a further wireless power feeder according to the present invention is a wireless power feeder which performs power feed by a non-contact method to a wireless power receiver having a power receive resonance circuit including a power receive coil and a power receive capacitor,
wherein, in the wireless power feeder,
the power feed coil does not substantially constitute a resonance circuit; and
the control circuit performs power feed from the power feed coil to the power receive coil on the basis of a magnetic field resonance effect between the power feed coil and the power receive coil, by supplying AC current to the power feed coil, and associates a frequency of the AC current with a frequency of resonance current in the power receive resonance circuit.

Here, "does not substantially constitute a resonance circuit" means that the power feed coil does not form a resonance circuit of which the resonance frequency is the resonance frequency of the power receive resonance circuit, but does not exclude the fact that the power feed coil may resonate incidentally with any of the circuit elements. For example, "does not substantially constitute a resonance circuit" means that a capacitor is not provided in series or in parallel with the power feed coil, in order to form a resonance circuit having a resonance frequency which is the resonance frequency of the power receive resonance circuit.

In this yet a further wireless power feeder, in the "magnetic field resonance effect between the power feed coil and the power receive coil", if the frequency of the AC current and the resonance frequency of the power receive resonance circuit (in other words, the frequency of the current flowing in the power receive coil) are associated, for example, then it is possible to achieve a power factor of 1 for the transmitted power, even if the power feed coil itself does not resonate, and hence highly efficient power transmission is possible.

In this yet a further wireless power feeder, it is possible to make the frequency of the AC current supplied to the power feed coil follow the resonance frequency of the power receive resonance circuit, just by using a simple control circuit composition. Therefore, even if there is deviation in the distance between the power feed coil and the power receive coil, or the center positions of the power feed coil and the power receive coil, it is still possible to achieve efficient power transmission at all times.

It should be noted that the inventors discovered that, in a system comprising a two resonance circuits, namely, a power feed resonance circuit and a power receive resonance circuit, there are two frequencies at which a power factor of 1 is obtained for the transmitted power. Consequently, in a wireless power transmission system of this kind, there is a risk of malfunction, when performing control to achieve a power factor of 1 for the transmitted power.

However, according to this yet a further wireless power feeder, since the power feed coil does not substantially constitute a resonance circuit, there is one frequency at which the power factor of the transmitted power becomes 1. Consequently, it is possible to prevent malfunction when implementing control so that the power factor of the transmitted power is 1, in other words, in control which associates the frequency of the AC current supplied to the power feed coil with the frequency of the resonance current of the power receive resonance circuit, by means of a control circuit.

The wireless power receiver according to the present invention is a wireless power receiver which acquires power by a non-contact method from the further wireless power feeder or the yet a further wireless power feeder described above,
the wireless power receiver comprising: a power receive resonance circuit including a power receive coil and a power receive capacitor, for acquiring power from the power feed coil by the power receive coil, on the basis of a magnetic field resonance effect between the power feed coil in the wireless power feeder and the power receive coil; a power receive load coil which receives the power fed from the power receive coil by a non-contact method; and an impedance converter, which is arranged between the power receive load coil and a load, an impedance of a primary side connected to the power receive load coil being higher than an impedance of a secondary side connected to the load.

According to this wireless power receiver, since power is acquired by a non-contact method from the further wireless power feeder or the yet a further wireless power feeder described above, it is possible to make the frequency of the AC current supplied to the power feed coil follow the frequency of the current flowing in the power receive coil at all times, just by using a simple control circuit composition. Therefore, even if there is deviation in the distance between the power feed coil and the power receive coil, or the center positions of the power feed coil and the power receive coil, it is still possible to achieve efficient power transmission at all times.

Therefore, in order to suppress change in the state of resonance in the power receive resonance circuit due to the effects of the load, the power receive coil in the power receive resonance circuit is desirably connected to the load by means of electromagnetic coupling with the power receive load coil. Furthermore, from the viewpoint of the power transmission efficiency, it is desirable to have a high degree of coupling (coupling coefficient) between the power receive coil in the power receive resonance circuit and the power receive load coil in the wireless power receiver. However, if the extent of coupling between the power receive coil and the power receive load coil is high, then when the load impedance is low, the Q value of the power receive resonance circuit falls and the resonance current in the power receive resonance circuit declines. Consequently, the power transmission efficiency falls.

However, according to this wireless power receiver, since an impedance converter is disposed between the power receive load coil and the load and hence the impedance on the power receive load coil side in the impedance converter is high, it is possible to suppress decline in the Q value of the power receive resonance circuit even if the extent of coupling between the power receive coil and the power receive load coil is high and the load impedance is low, and therefore it is possible to suppress decline in the resonance current of the power receive resonance circuit. As a result of this, decline in the power transmission efficiency from the wireless power feeder can be restricted.

In particular, decline in the power transmission efficiency due to the effects of the load becomes more marked, the greater the distance between the power feed coil and the power receive coil, but according to this wireless power receiver, a large effect in suppressing decline in the power transmission efficiency is obtained when the distance between the power feed coil and the power receive coil is large.

A further wireless power transmission system according to the present invention is a wireless power transmission system which performs power transmission by a non-contact method between the further wireless power feeder or the yet a further wireless power feeder described above and the wireless power receiver described above, wherein power transmission is performed from the power feed coil to the power receive coil on the basis of a magnetic field resonance effect between the power feed coil in the wireless power feeder and the power receive coil in the wireless power receiver.

According to this further wireless power transmission system, since power is acquired by a non-contact method from the further wireless power feeder or the yet a further wireless power feeder described above, it is possible to make the frequency of the AC current supplied to the power feed coil follow the frequency of the current flowing in the power receive coil at all times, just by using a simple control circuit composition. Therefore, even if there is deviation in the distance between the power feed coil and the power receive coil, or the center positions of the power feed coil and the power receive coil, it is still possible to achieve efficient power transmission at all times.

According to the present invention, it is possible to perform efficient power transmission, without using a control circuit having a complicated composition.

DESCRIPTION OF THE PREFERRED EMBODIMENTS

Figure 1:
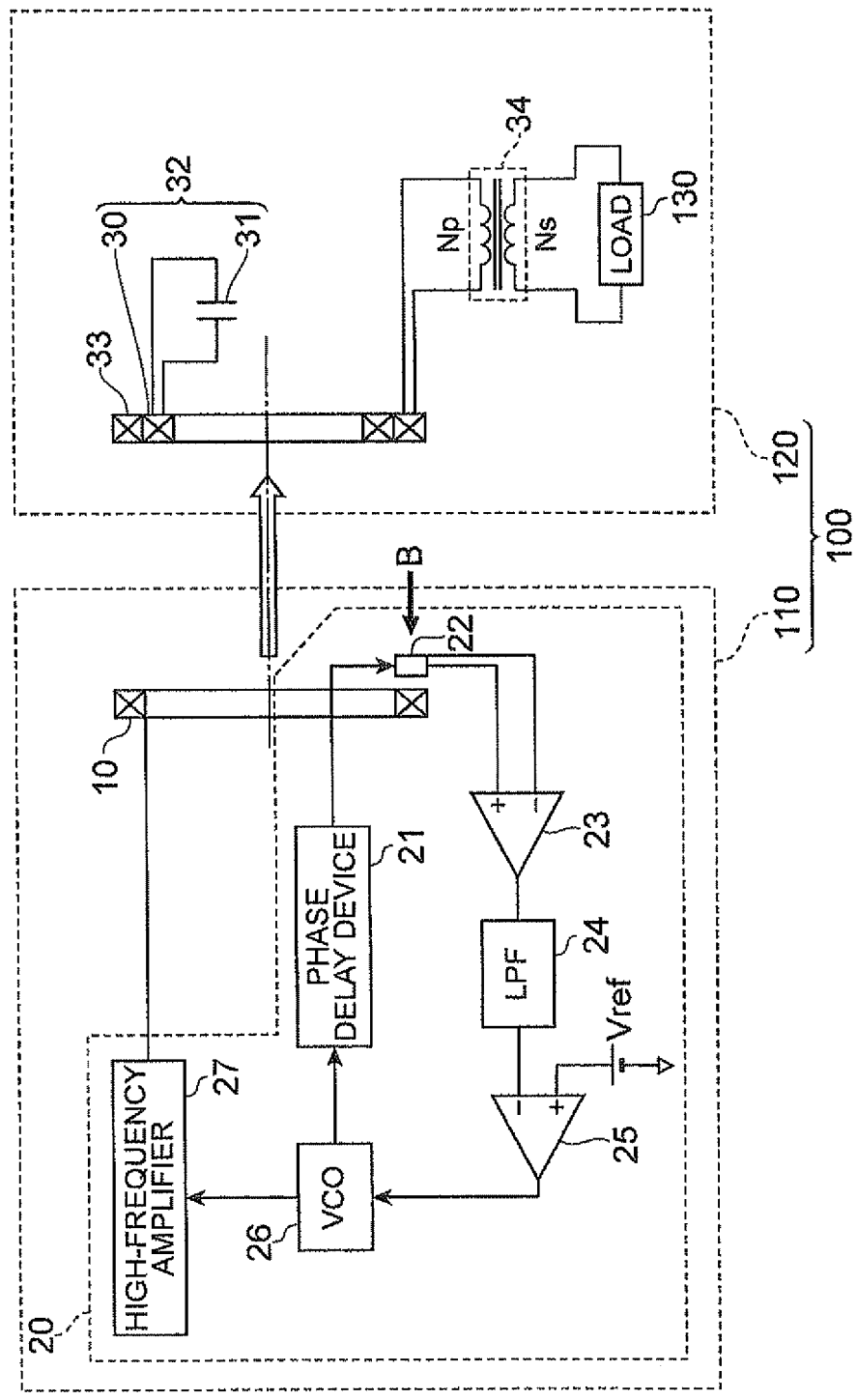
FIG. 1 is a cross-sectional diagram showing the physical structure of the power feed coil, the magnetic sensor, the power receive coil, and the power receive load coil which are shown in FIG. 2.

Below, a preferred embodiment of the present invention is described in detail with reference to the drawings. Parts which are the same or equivalent in the respective drawings are labeled with the same reference numerals.

[First Embodiment]

Figure 2:
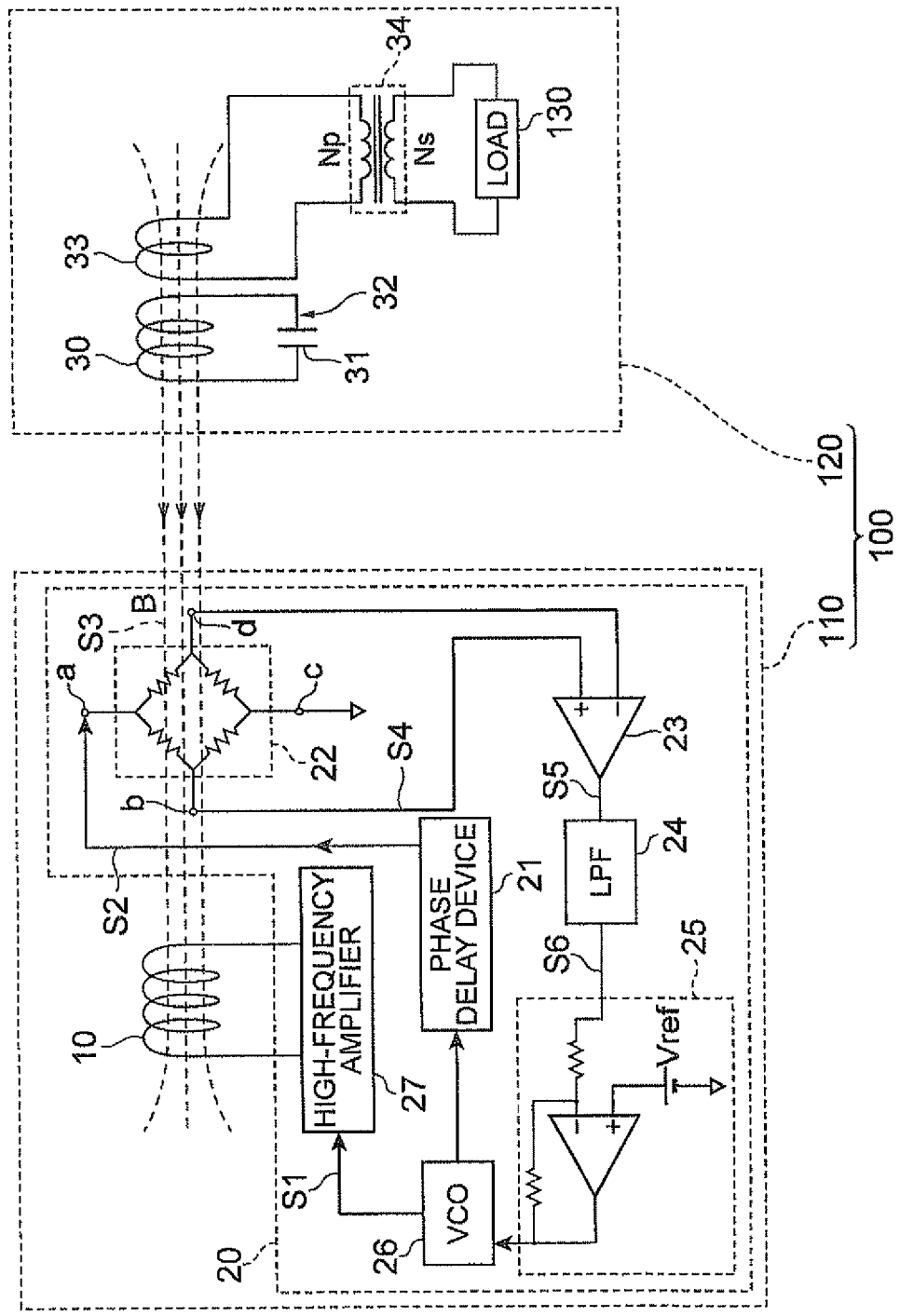
FIG. 2 is a diagram showing the electrical composition of a wireless power transmission system, a wireless power feeder and a wireless power receiver relating to a first embodiment of the present invention.

FIG. 2 is a diagram showing the electrical composition of a wireless power transmission system relating to a first embodiment of the present invention. The wireless power transmission system 100 shown in FIG. 2 comprises a wireless power feeder 110 and a wireless power receiver 120, and performs power transmission by a non-contact method from the wireless power feeder 110 to the wireless power receiver 120.

The wireless power feeder 110 comprises a power feed coil 10 and a control circuit 20. On the other hand, the wireless power receiver 120 comprises a power receive resonance circuit 32 comprising of a power receive coil 30 and a power receive capacitor 31.

In the wireless power feeder 110, the control circuit 20 supplies an AC current (for example, a square wave or sinusoidal wave current) to the power feed coil 10, whereby power is supplied from the power feed coil 10 to the power receive coil 30 on the basis of a magnetic field resonance effect between the power feed coil 10 and the power receive coil 30. Here, the "magnetic field resonance effect between the power feed coil 10 and the power receive coil 30" means a resonance effect of the power receive resonance circuit 32 based on an AC magnetic field which is produced by the power feed coil 10. When an AC current is supplied to the power feed coil 10, an AC magnetic field is produced by the power feed coil 10. By this means, the power feed coil 10 and the power receive coil 30 are magnetically coupled, and the power receive resonance circuit 32 resonates. In so doing, the control circuit 20 detects the frequency information of the resonance current in the power receive resonance circuit 32 (in other words, the frequency information of the current flowing in the power receive coil 30), and matches the frequency of the AC current with the frequency of the resonance current in the power receive resonance circuit 32. By this means, even if the power feed coil 10 itself does not resonate, it is possible to achieve a power factor of 1 in the transmitted power, and highly efficient power transmission can be performed.

In this way, in the wireless power feeder 110, the power feed coil 10 does not substantially constitute a resonance circuit. Here, "does not substantially constitute a resonance circuit" means that it does not form a resonance circuit of which the resonance frequency is the resonance frequency of the power receive resonance circuit 32, but does not exclude the fact that the power feed coil 10 may resonate incidentally with any of the circuit elements. For example, "does not substantially constitute a resonance circuit" means that a capacitor is not provided in series or in parallel with the power feed coil 10, in order to form a resonance circuit having a resonance frequency which is the resonance frequency of the power receive resonance circuit 32.

In the wireless power feeder 110, the stronger the magnetic field coupling between the power feed coil 10 and the power receive coil 30, the greater the effect on the resonance frequency of the power receive resonance circuit 32. More specifically, the resonance frequency of the power receive resonance circuit 32 in a state where the power feed coil 10 and the power receive coil 30 are in sufficiently close proximity to enable magnetic field coupling therebetween diverges from the resonance frequency of the power receive resonance circuit 32 alone, in a state where the power feed coil 10 and the power receive coil 30 are sufficiently distanced from each other to enable magnetic field coupling therebetween to be ignored. By supplying an AC current of a frequency close to the resonance frequency of the power receive resonance circuit 32, to the power feed coil 10, it is possible to achieve wireless power feed based on a magnetic field resonance mechanism.

Next, in the wireless power receiver 120, a load 130 is connected via a power receive load coil 33 which is electromagnetically coupled (coupled by electromagnetic induction) with the power receive coil 30. By this means, it is possible to suppress decline in the Q value of the power receive resonance circuit which occurs due to the effects of the load 130. Here, from the viewpoint of the power transmission efficiency, it is desirable for the extent of coupling between the power receive coil 30 and the power receive load coil 33 to be high; for example, the coupling coefficient between the power receive coil 30 and the power receive load coil 33 is set to no less than 0.9.

Furthermore, the power receive load coil 33 is connected to the load 130 via an output transformer (impedance converter) 34. The primary side of the output transformer 34 is connected to the power receive load coil 33, and the secondary side thereof is connected to the load 130. The number of windings of the primary side coil Np of the output transformer 34 is larger than the number of windings of the secondary side coil Ns. By this means, the primary side of the output transformer 34 has a high impedance and the secondary side of the output transformer 34 has a low impedance.

Figures 3A, 3B, 3C:
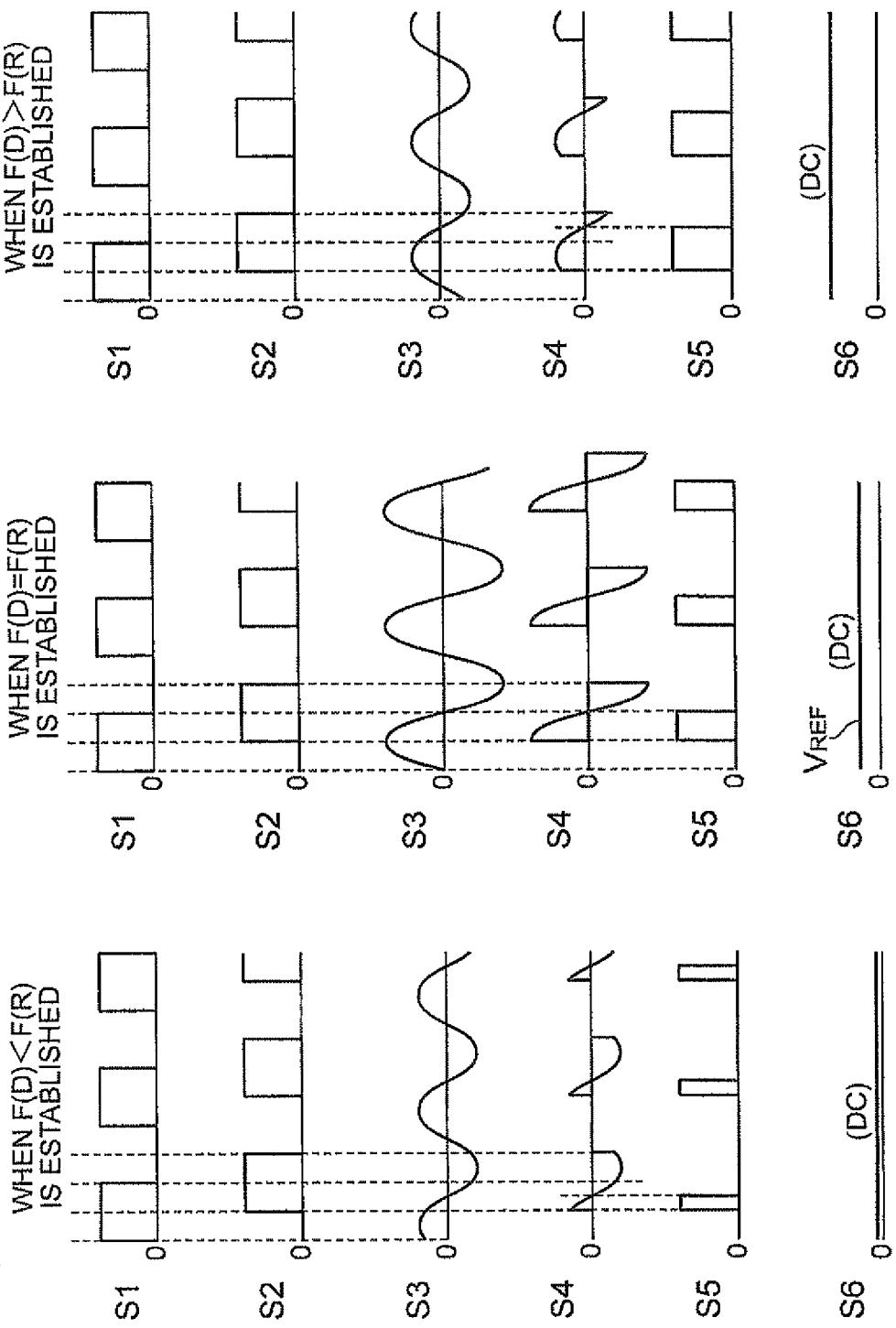
FIGS. 3A to 3C are diagrams showing the signal waveforms of respective sections of the wireless power feeder shown in FIG. 2.

Next, the control circuit 20 in the wireless power feeder 110 is described in detail with reference to FIG. 3, in addition to FIG. 2. FIG. 3 is a diagram showing the waveforms of the signals S1 to S6 of respective sections of the wireless power feeder shown in FIG. 2. In FIG. 3A to FIG. 3C, the relationships between the drive frequency generated by the VCO (in other words, the frequency of the AC current supplied to the power feed coil) F(D) and the resonance frequency of the power receive resonance circuit (in other words, the frequency of the current flowing in the power receive coil) F(R) are respectively different: FIG. 3A shows the signal waveforms of the respective sections when F(D)<F(R); FIG. 3B shows the signal waveforms of the respective sections when F(D)=F(R), and FIG. 3C shows the signal waveforms of the respective sections when F(D)>F(R).

The control circuit 20 comprises: a phase delay device (phase delay circuit) 21, a magnetic sensor 22, a comparator 23, a low-pass filter (LPF) 24, an error amplifier 25, a voltage-controlled oscillator (VCO) 26, and a high-frequency amplifier 27. In the present embodiment, the comparator 23, the LPF 24 and the error amplifier 25 constitute a phase detection circuit, and the VCO 26 and the high-frequency amplifier 27 constitute an AC current generation circuit.

The phase delay device 21 generates a delayed AC voltage S2 in which the phase of the AC voltage S1 from the VCO 26 is delayed by 90°, and supplies this delayed AC voltage S2 to the magnetic sensor 22. The amount of delay in the phase of the delayed AC voltage S2 with respect to the phase of the AC voltage S1 from the VCO 26 is desirably 90°, but may be less than 360° and no less than 30°.

The magnetic sensor 22 detects the frequency information of the resonance current of the power receive resonance circuit 32 (in other words, the frequency information of the current flowing in the power receive coil 30) by detecting the magnetic field (B) S3 produced by the power receive coil 30. For the magnetic sensor 22, it is possible to employ a Hall element, an MR element, a GMR element, a TMR element, or the like. In the following description, a case where a Hall element is used as the magnetic sensor 22 is given as an example.

The magnetic sensor 22 is biased by the delayed AC voltage S2. By this means, the magnetic sensor 22 generates an output voltage S4 which corresponds to the AND calculation result of the delayed AC voltage S2 and the AC magnetic field S3. Since the magnetic sensor 22 is driven by the AC voltage from the VCO 26, the output voltage S4 is a sinusoidal wave and the amplitude thereof is a maximum.

The comparator 23 compares the output voltage S4 from the magnetic sensor 22 with a comparison voltage. In the present embodiment, the inverse voltage of the output voltage S4 is used as the comparison voltage. By this means, a pulse voltage S5 corresponding to the positive timing period in the output voltage S4 is generated (waveform shaping).

The phase delay device 21 and the magnetic sensor 22 function as a so-called AND circuit, and perform an AND calculation of the magnetic field generated by the power receive coil 30 (in other words, the current flowing through the power receive coil 30) S3, and the delayed AC voltage (in other words, the output AC voltage from the VCO 26) S2. A pulse voltage which corresponds to the phase difference between the current flowing in the power receive coil 30 and the output AC voltage of the VCO 26 is generated by this AND circuit and the comparator 23.

The LPF 24 averages the pulse voltage S5 from the comparator 23 and outputs the averaged pulse voltage to the error amplifier 25. The error amplifier 25 amplifies the error between the averaged pulse voltage S6 and the reference voltage Vref, and outputs same to the VCO 26. The VCO 26 takes the voltage from the error amplifier 25 as a control voltage (phase difference instruction voltage), and generates an AC voltage having a frequency corresponding to this voltage. Depending on the level of the voltage S6 in relation to the control voltage of the VCO 26, the error amplifier 25 does not necessarily have to be provided.

In this way, the frequency of the output AC voltage of the VCO 26 can be matched to the phase frequency of the magnetic field produced by the power receive coil 30 (the phase frequency of the current flowing in the power receive coil 30) by feedback control of the phase delay device 21, the magnetic sensor 22, the comparator 23, the LPF 24, the error amplifier 25, and the VCO 26.

To give a detailed description, when F(D)<F(R) as shown in FIG. 3A, the phase of the output AC voltage S1 from the VCO 26 is advanced with respect to the phase of the magnetic field S3 produced by the power receive coil 30 (the current flowing in the power receive coil 30), and therefore the pulse width of the pulse voltage S5 is smaller than in the state of equilibrium F(D)=F(R) shown in FIG. 3B, and the averaged voltage S6 falls. In this case, feedback is applied in such a manner that the phase difference between S1 and S3 becomes zero, in other words, so that S6 becomes equal to the reference voltage Vref, and the state of equilibrium shown in FIG. 3B is achieved.

On the other hand, if F(D)>F(R) as shown in FIG. 3C, then the phase relationship between the output AC voltage S1 of the VCO 26 and the magnetic field S3 produced by the power receive coil 30 (the current flowing in the power receive coil 30) becomes the reverse of the state F(D)<F(R) shown in FIG. 3A, and the phase of S1 becomes delayed with respect to the phase of S3, which means that the pulse width of the pulse voltage S5 becomes larger than in the state of equilibrium F(D)=F(R) shown in FIG. 3B and the averaged voltage S6 rises. In this case, similarly to the foregoing, feedback is applied in such a manner that the phase difference between S1 and S3 becomes zero, in other words, so that S6 becomes equal to the reference voltage Vref, and the state of equilibrium shown in FIG. 3B is achieved.

In this way, when the circuit is operating normally, the system is tuned automatically at all times to the ideal state F(D)=F(R) shown in FIG. 3B, in other words, a state where the phase of the output AC voltage S1 of the VCO 26 matches the phase of the magnetic field S3 produced by the power receive coil 30 (the current flowing in the power receive coil 30), and this state of equilibrium is maintained.

The high-frequency amplifier 27 supplies an AC current having a phase frequency matched to the phase frequency of the current flowing in the power receive coil 30 (the phase frequency of the resonance current in the power receive resonance circuit 32), to the power feed coil 10, in accordance with the output AC voltage S1 from the VCO 26.

Figure 4:
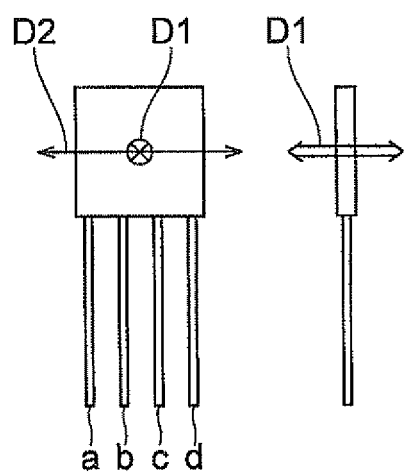
FIG. 4 is a diagram showing one example of the physical shape of the magnetic sensor shown in FIG. 2.
Figure 5:
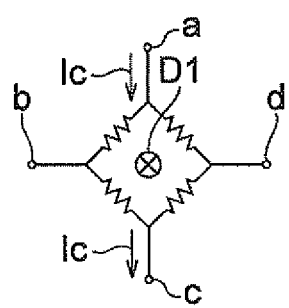
FIG. 5 is a diagram showing one example of an equivalent electrical circuit of the magnetic sensor shown in FIG. 2.
Figure 6:
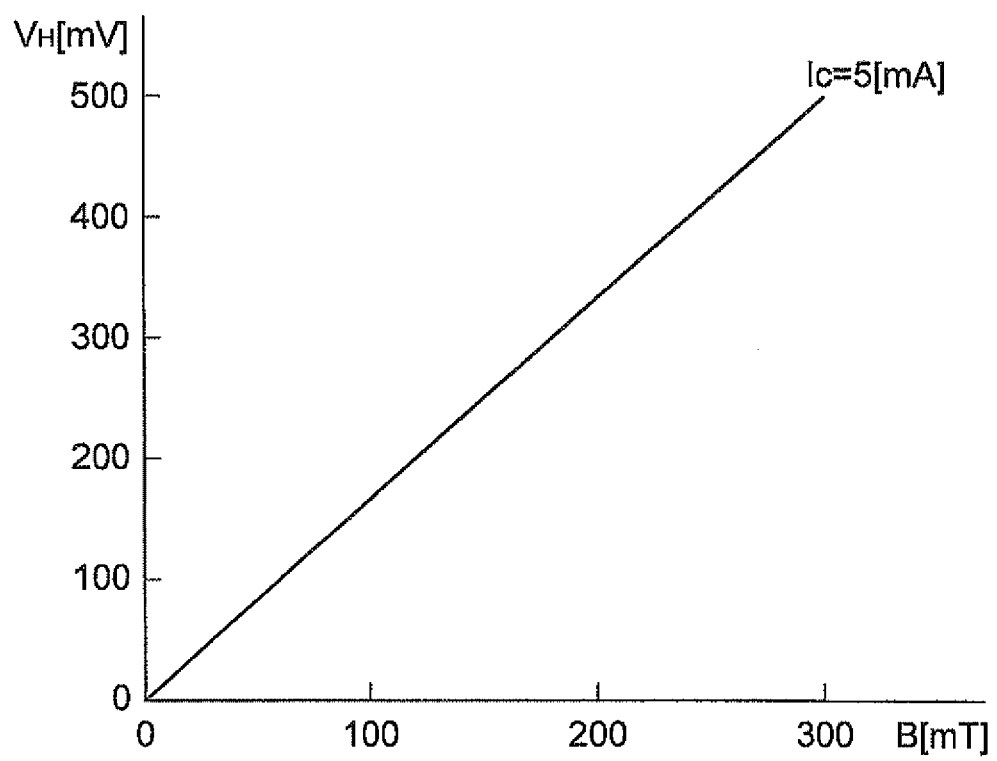
FIG. 6 is a diagram showing the magnetic flux density—Hall voltage characteristics of a GaAs Hall element, as one example of the magnetic sensor shown in FIG. 2.

Next, the magnetic sensor 22 will be described in detail. FIG. 4 is a diagram showing one example of the physical shape of a magnetic sensor, and FIG. 5 is a diagram showing one example of an equivalent electrical circuit of a magnetic sensor. Furthermore, FIG. 6 is a diagram showing the magnetic flux density—Hall voltage characteristics of a GaAs Hall element, as one example of a magnetic sensor.

As shown in FIG. 4, the magnetic sensor 22 is sensitive to a magnetic field in the sensing direction D1 (the direction perpendicular to the plane of the drawing), and has no sensitivity (zero output) to a magnetic field in the non-sensing direction D2 (the direction horizontal to the plane of the drawing). As shown in FIG. 5, the magnetic sensor 22 assumes an operational state when the bias current Ic flows from the terminal a to the terminal c, and hence a Hall voltage V(H) is generated between terminal b and terminal d. As shown in FIG. 6, in the magnetic sensor 22, if the bias current Ic is 0 mA, then the Hall voltage V(H) is zero whatever the magnetic field applied in the sensing direction D1, but when a bias current Ic flows due to the application of the bias voltage, a linear output is obtained in direct proportion to the magnetic flux density B (mT) in the sensing direction D1 which passes through the magnetic sensor 22.

FIG. 1 is a cross-sectional diagram showing the physical structure of the power feed coil 10, the magnetic sensor 22, the power receive coil 30, and the power receive load coil 33 which are shown in FIG. 2. FIG. 1 shows the electrical composition of the peripheral circuit elements of these coils.

The power feed coil 10 and the power receive coil 30 are provided in mutually opposing fashion, and the power receive load coil 33 is wound about the outer circumference of the power receive coil 30. The magnetic sensor 22 is arranged between the power feed coil 10 and the power receive coil 30, adjacently to the power feed coil 10 above the circular circumference of the power feed coil 10.

Figure 7A:
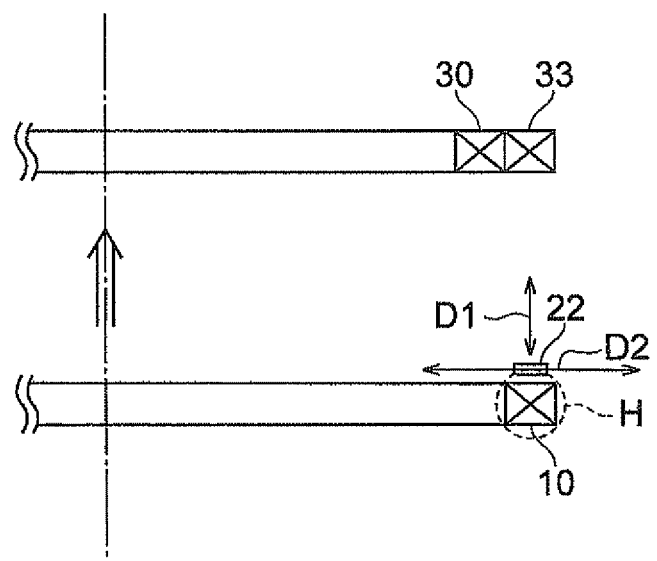
FIGS. 7A and 7B are diagrams showing examples of the arrangement of a magnetic sensor with respect to a power feed coil.

Furthermore, as shown in FIG. 7A, the magnetic sensor 22 is arranged in such a manner that the non-sensing direction D2 is in an angular range of ±10° with respect to the magnetic field vector (lines of magnetic force) H generated by the power feed coil 10. In other words, the magnetic sensor 22 is arranged in such a manner that the sensing direction D1 is in an angular range of 90°±10° with respect to the magnetic field vector H. By this means, the magnetic sensor 22 is able to detect the magnetic field produced by the power receive coil 30 accurately, without being affected by the magnetic field from the power feed coil 10. The non-sensing direction D2 of the magnetic sensor 22 is desirably in an angular range of ±5° with respect to the magnetic field vector H, and more desirably is parallel to the magnetic field vector H.

Figure 7B:
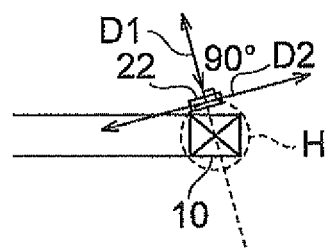

As shown in FIG. 7A, the magnetic sensor 22 is arranged over the windings of the power feed coil 10. However, as shown in FIG. 7B, the magnetic sensor 22 may be provided at an inclination so as to revolve about the windings of the power feed coil 10 along the magnetic field vector H, in such a manner that the non-sensing direction D2 is in an angular range of ±10° with respect to the magnetic field vector H. In other words, the magnetic sensor 22 may be provided at an inclination so as to revolve about the windings of the power feed coil 10 along the magnetic field vector H, in such a manner that the sensing direction D1 is in an angular range of 90°±10° with respect to the magnetic field vector H.

According to the wireless power feeder 110, the wireless power receiver 120 and the wireless power transmission system 100 of the first embodiment, as described above, the phase delay device 21 and the magnetic sensor 22 in the control circuit 20 function as a so-called AND circuit, which performs an AND calculation of the magnetic field produced by the power receive coil 30 (in other words, the current flowing in the power receive coil 30) and the delayed AC voltage (in other words, the output AC voltage from the VCO 26). A pulse voltage which corresponds to the phase difference between the current flowing in the power receive coil 30 and the output AC voltage of the VCO 26 is generated by this AND circuit and the comparator 23. Therefore, it is possible to match the frequency of the output AC voltage from the VCO 26 (in other words, the frequency of the AC current supplied to the power feed coil 10), with the frequency of the current flowing in the power receive coil 30, by means of feedback control of the aforementioned circuits and the LPF 24, the error amplifier 25, and the VCO 26.

In this way, according to the wireless power feeder 110, the wireless power receiver 120 and the wireless power transmission system 100 of this first embodiment, it is possible to perform automatic tuning so that the frequency of the AC current supplied to the power feed coil 10 follows the frequency of the current flowing in the power receive coil 30 at all times, simply by using a straightforward control circuit composition constituted by a phase delay device 21, a magnetic sensor 22, a comparator 23, a LPF 24, an error amplifier 25, a VCO 26, and a high-frequency amplifier 27. Therefore, even if there is deviation in the distance between the power feed coil 10 and the power receive coil 30, or the center positions of the power feed coil 10 and the power receive coil 30, it is still possible to achieve efficient power transmission at all times.

Furthermore, according to the wireless power feeder 110 of this first embodiment, the magnetic sensor 22 is arranged in such a manner that the non-sensing direction forms an angle within a range of ±10° with respect to the magnetic field vector (lines of magnetic force) generated by the power feed coil, and therefore it is possible to detect the magnetic field produced by the power receive coil 30 accurately, without detecting unwanted magnetic field produced by the power feed coil 10.

It should be noted that the inventors discovered that, in a system comprising a two resonance circuits, namely, a power feed resonance circuit and a power receive resonance circuit, as in the second embodiment described below, there are two frequencies at which a power factor of 1 is obtained for the transmitted power. Consequently, in a wireless power transmission system of this kind, there is a risk of malfunction, when performing control to achieve a power factor of 1 for the transmitted power.

However, according to the wireless power feeder 110 of the first embodiment, since the power feed coil 10 does not substantially constitute a resonance circuit, there is one frequency at which the power factor of the transmitted power becomes 1. Consequently, it is possible to prevent malfunction when implementing control so that the power factor of the transmitted power is 1, in other words, in control which associates the frequency of the AC current supplied to the power feed coil 10 with the frequency of the resonance current of the power receive resonance circuit 32, by means of the control circuit 20.

From the viewpoint of the power transmission efficiency, it is desirable to have a high degree of coupling (coupling coefficient) between the power receive coil 30 and the power receive load coil 33 in the wireless power receiver 120. However, in cases where the extent of coupling between the power receive coil 30 and the power receive load coil 33 is raised, then if the impedance of the load 130 is low, the Q value of the power receive resonance circuit 32 declines due to the effects of the load 130, and the state of resonance of the power receive resonance circuit 32 deteriorates. Therefore, the resonance current of the power receive resonance circuit 32 falls (the value of the current passing through the power receive resonance circuit 32 becomes smaller), the state of magnetic field resonance becomes weaker, and the power transmission efficiency from the wireless power feeder 110 to the wireless power receiver 120 falls.

However, according to the wireless power receiver 120 of the first embodiment, an output transformer 34 is arranged between the power receive load coil 33 and the load 130, and therefore in cases where the impedance on the power receive load coil 33 side in the output transformer 34 is high, it is possible to suppress decline in the Q value of the power receive resonance circuit 32, even if the extent of coupling between the power receive coil 30 and the power receive load coil 33 is raised and even if the impedance of the load 130 is low, and therefore decline in the resonance current of the power receive resonance circuit 32 can be suppressed. As a result of this, decline in the power transmission efficiency from the wireless power feeder 110 to the wireless power receiver 120 can be restricted. The impedance ratio of the output transformer 34 (the ratio of the primary side impedance to the secondary side impedance in the output transformer 34) should be greater than 1, and if the impedance looking at the load 130 side from the output transformer 34 is no more than several tens of Ω, then desirably the impedance ratio is no less than 5.

In particular, decline in the power transmission efficiency due to the effects of the load becomes more marked, the greater the distance between the power feed coil 10 and the power receive coil 30, but according to this wireless power receiver 120, a large effect in suppressing decline in the power transmission efficiency is obtained when the distance between the power feed coil 10 and the power receive coil 30 is large.

[Second Embodiment]

In the first embodiment, a wireless power transmission system 100 in which the wireless power feeder 110 side does not resonate was given as an example, but a wireless power transmission system which comprises two resonance circuits, a power feed resonance circuit and a power receive resonance circuit, is not excluded from the scope of the present invention.

Figure 10:
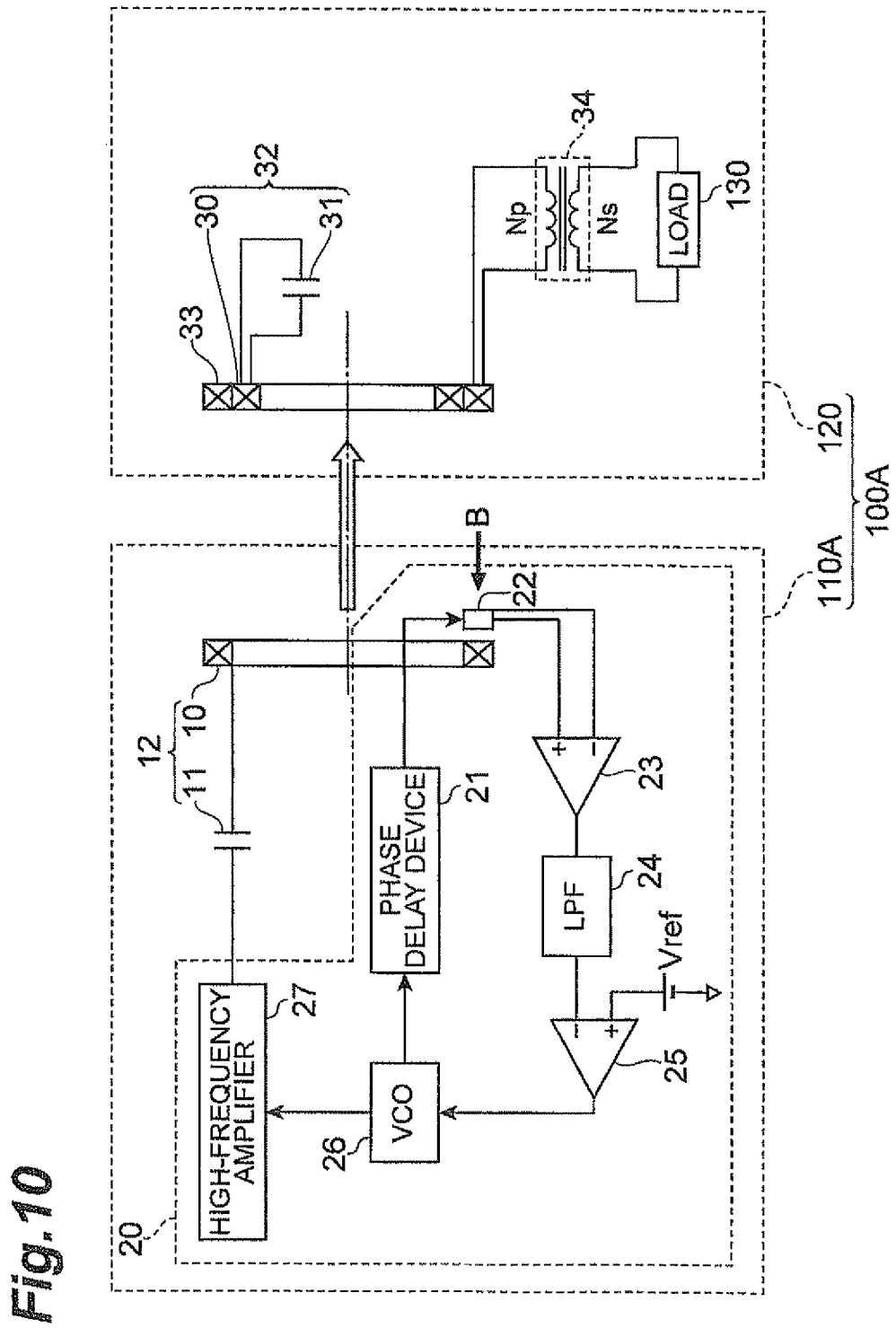
FIG. 10 is a cross-sectional diagram showing the physical structure of the power feed coil, the magnetic sensor, the power receive coil, and the power receive load coil which are shown in FIG. 11.
Figure 11:
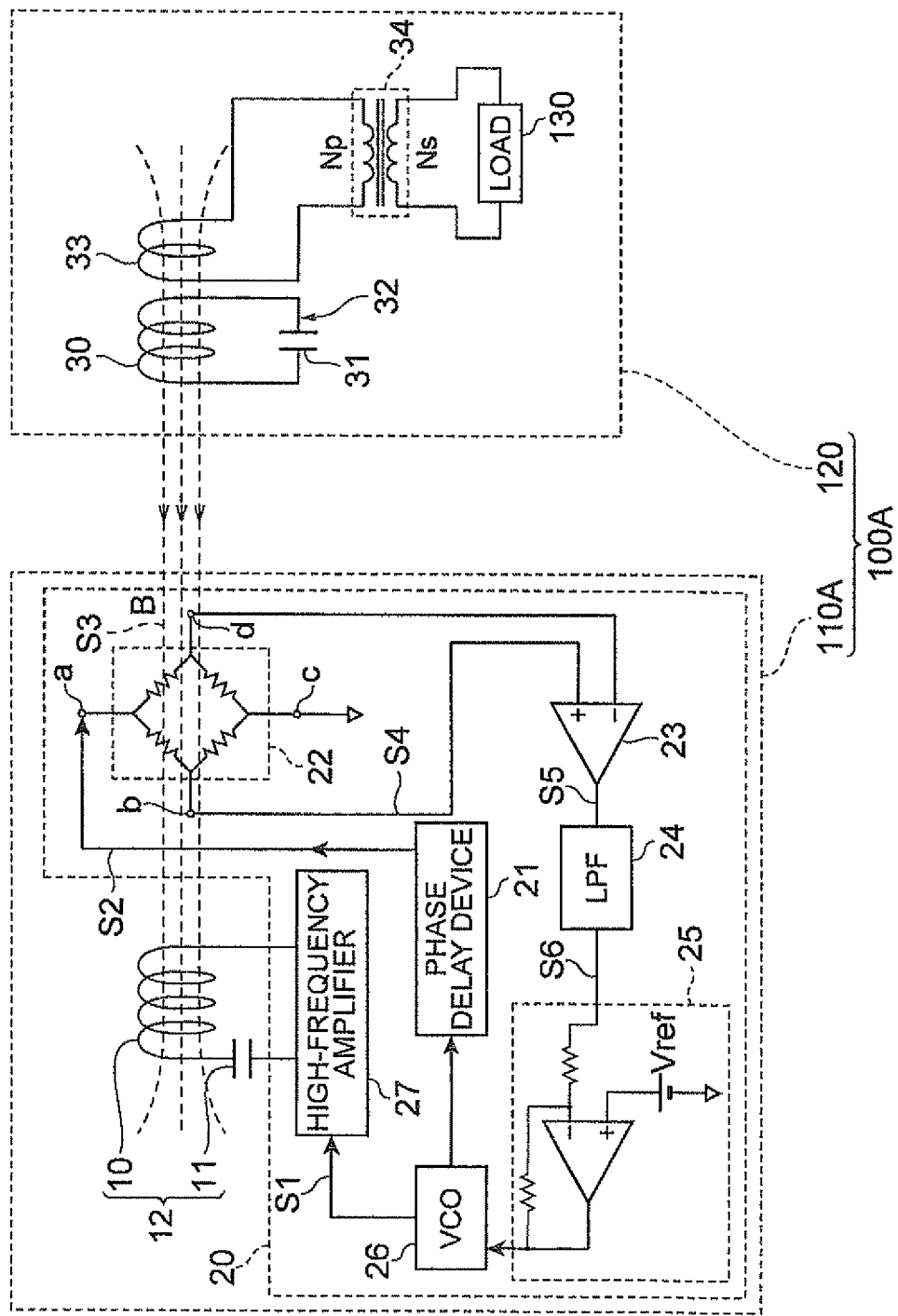
FIG. 11 is a diagram showing the electrical composition of a wireless power transmission system, a wireless power feeder and a wireless power receiver relating to a second embodiment of the present invention.

FIG. 11 is a diagram showing an electrical composition of a wireless power feeder in a wireless power transmission system relating to the second embodiment of the present invention, and FIG. 10 is a cross-sectional diagram showing a schematic view of the physical structure of the power feed coil 10, the magnetic sensor 22, the power receive coil 30 and the power receive load coil 33 shown in FIG. 11. FIG. 10 shows the electrical composition of the peripheral circuit elements of these coils.

The wireless power transmission system 100A according to the second embodiment comprises a wireless power feeder 110A instead of the wireless power feeder 110, and the wireless power feeder 110A may comprise a power feed resonance circuit 12 constituted by a power feed coil 10 and a power feed capacitor 11, instead of the power feed coil 10. Furthermore, resonance may be generated via a power feed exciting coil. In these cases, the resonance frequency of the power feed resonance circuit and the resonance frequency of the power receive resonance circuit are substantially the same.

Even in the wireless power feeder 110A and the wireless power transmission system 100A according to the second embodiment, it is possible to obtain similar benefits to those of the wireless power feeder 110 and the wireless power transmission system 100 according to the first embodiment.

[Third Embodiment]

In the second embodiment, a wireless power feeder 110A which comprises just one magnetic sensor 22 was given as an example, but it may also comprise a plurality of magnetic sensors 22.

Figure 9:
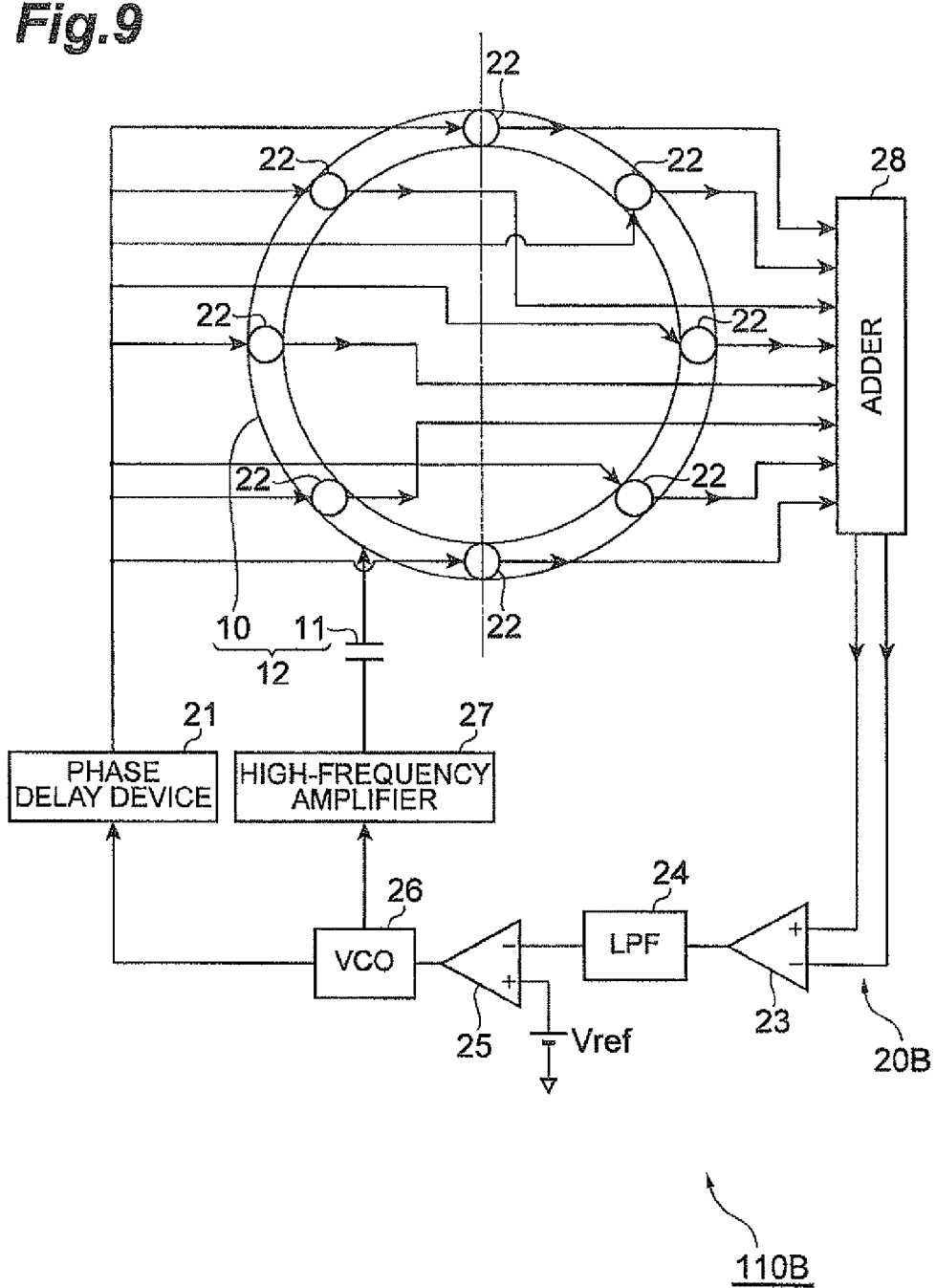
FIG. 9 is a diagram showing the composition of a wireless power feeder relating to a third embodiment of the present invention.

FIG. 9 is a diagram showing the electrical composition of a wireless power feeder relating to a third embodiment of the present invention. In this way, the wireless power feeder 110B differs from the second embodiment in respect of comprising a control circuit 20B instead of the control circuit 20 in the wireless power feeder 110A. The control circuit 20B comprises eight magnetic sensors 22 instead of the magnetic sensor 22, in the control circuit 20, and also comprises an adder 28.

The magnetic sensors 22 are arranged equidistantly, 45° apart respectively, over the winding circumference of the power feed coil 10. The magnetic sensors 22 are respectively connected to the adder 28. The adder 28 adds the output voltages of the eight magnetic sensors 22 and outputs the result to the comparator 23. The rest of the composition of the wireless power feeder 110B is the same as the wireless power feeder 110A.

In the wireless power feeder 110B according to this third embodiment, it is possible to obtain similar advantages to the wireless power feeder 110A of the second embodiment.

Moreover, according to the wireless power feeder 110B of the third embodiment, even if there is divergence in the center positions of the power feed coil 10 and the power receive coil 30, it is still possible to detect the magnetic field produced by the power receive coil 30 (the current flowing in the power receive coil 30) efficiently. In other words, it is possible to detect the magnetic field produced by the power receive coil 30 (the current flowing in the power receive coil 30) efficiently, not only when the central winding axis of the power feed coil 10 and the central winding axis of the power receive coil 30 coincide with each other (when the power receive coil 30 is positioned directly over the power feed coil 10) and the power feed coil 10 and the power receive coil 30 are parallel with each other, but also when the power receive coil 30 is displaced obliquely with respect to the power feed coil 10 (when the coils are displaced relatively in the horizontal direction and are also non-parallel).

The present invention is not limited to the present embodiments described above and can be modified in various ways. For example, in the present embodiment, a wireless power transmission system is described in which at least the wireless power receiver comprises a power receive resonance circuit 32 constituted by a power receive coil 30 and a power receive capacitor 31, and power transmission is performed from the power feed coil 10 to the power receive coil 30 on the basis of a magnetic field resonance effect between the power feed coil 10 and the power receive coil 30, but the characteristic features of the present invention can also be applied to a wireless power transmission system in which the wireless power feeder and the wireless power receiver do not comprise resonance circuits and power transmission is performed from the power feed coil 10 to the power receive coil 30 on the basis of an electromagnetic induction effect between the power feed coil 10 and the power receive coil 30. In this case, the control circuit should match the frequency of the AC current of the frequency of the current flowing in the power receive coil 30, instead of the frequency of the resonance current of the power receive resonance circuit 32.

Moreover, in the present embodiment, the control circuit 20 is controlled in such a manner that the frequency of the AC current supplied to the power feed coil 10 and the frequency of the resonance current of the power receive resonance circuit 32 are matching, but even if the frequency of the AC current and the resonance frequency of the power receive resonance circuit 32 are not completely matching, for example, if they are substantially matching (are associated) within a range of error of about ±20%, it is possible to raise the power factor of the transmitted power, and high-efficiency power transmission can be carried out.

Furthermore, in the present embodiment, the control circuit 20 implements control in such a manner that an AC current having a frequency matching the frequency of the resonance current of the power receive resonance circuit 32 is supplied to the power feed coil 10, and the frequency of the resonance current of the power receive resonance circuit 32 and the frequency of the AC current supplied to the power feed coil 10 coincide with each other, but the control circuit 20 may also implement control to make the frequency of the AC current supplied to the power feed coil 10 substantially coincide with the frequency of the resonance current of the power receive resonance circuit 32, by adjusting the inductance of the power feed coil 10, for example.

Figure 8:
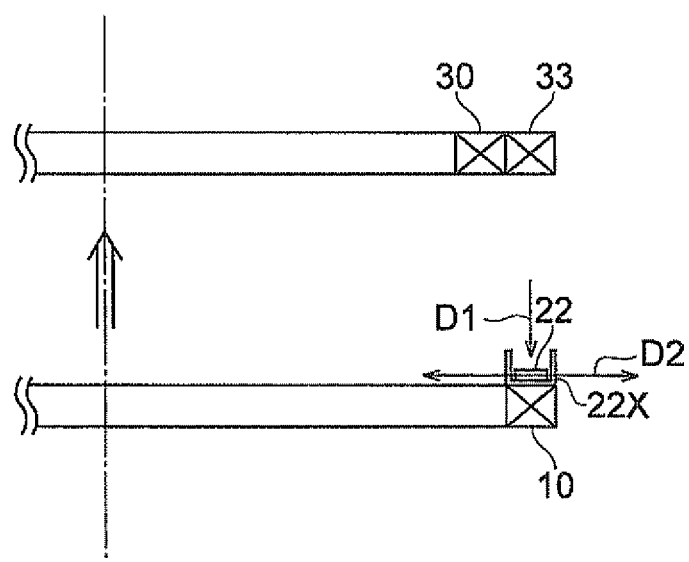
FIG. 8 is a diagram showing an example of the arrangement of a magnetic sensor with respect to a power feed coil.

Furthermore, in the present embodiment, an example is described in which, in order that the magnetic sensor 22 does not detect unwanted magnetic field produced by the power feed coil 10, the magnetic sensor 22 is arranged in such a manner that the non-sensing direction forms an angle in a range of ±10° with respect to the magnetic field vector (lines of magnetic force) generated by the power feed coil 10, but the method of avoiding the detection of unwanted magnetic field produced by the power feed coil 10 is not limited to the present embodiment. For example, it is possible to provide a magnetic shield member 22X, as shown in FIG. 8. The magnetic shield member 22X has an approximate U shape in cross-section, and magnetically shields the five surfaces of the magnetic sensor 22 apart from the power receive coil side opposing surface which opposes the power receive coil, namely, the power feed coil side opposing surface which opposes the power feed coil and the four side faces which intersect with the power receive coil side opposing surface and the power feed coil side opposing surface. The material used for the magnetic shield member 22X may be permalloy, silicon steel plate, or the like. By this means, the unwanted magnetic field from the power feed coil 10 is shielded and the magnetic sensor 22 is able to detect accurately the magnetic field produced by the power receive coil.

Furthermore, in the third embodiment, a mode is described in which eight magnetic sensors are provided, but the number of magnetic sensors is not limited to this. For example, there may be two or more magnetic sensors. Furthermore, these magnetic sensors may not be arranged equidistantly over the winding circumference of the power feed coil.

The characteristic features of the present invention can also be applied to signal transmission, as well as power transmission. For example, the wireless power transmission system according to the present invention can also be applied to a case where an analog signal or digital signal is transmitted by a non-contact method using a magnetic field resonance effect.

The present invention can be applied to: (1) a non-contact charger on a secondary cell side included in a mobile telephone, portable music player, TV or game machine controller, or the like; (2) non-contact power feed to factory-based conveyance robot; or (3) a system for non-contact charging of a PHV (plug-in hybrid vehicle), EV (electric vehicle), or the like.

In the present specification, the element for achieving a magnetic field resonance effect is called a "coil", but depending on the related technological field, it may also be called a "transmitter", "antenna", or the like.

Above, the principles of the present invention were described in relation to preferred embodiments, but it is recognized by persons skilled in the art that the present invention can be modified in terms of the arrangement and detailed composition, without deviating from these principles. The present invention is not limited to the specific composition disclosed in the embodiments. Consequently, rights are claimed in respect of all revisions and modifications originating from the range of the claims and the spirit of the claims.

What is claimed is:

1. A wireless power feeder which performs power feed by a non-contact method to a wireless power receiver having a power receive coil, the wireless power feeder comprising:

a power feed coil; and a control circuit which performs power feed from the power feed coil to the power receive coil on the basis of magnetic coupling between the power feed coil and the power receive coil, by supplying AC current to the power feed coil, and which associates a frequency of the AC current with a frequency of current flowing in the power receive coil, wherein the control circuit has:

a phase delay circuit which generates a delayed AC voltage in which the phase of an output AC voltage is delayed;

a magnetic sensor which is biased by the delayed AC voltage and detects a magnetic field generated by the power receive coil;

a phase detection circuit which generates a phase difference instruction voltage corresponding to a phase difference between an output voltage from the magnetic sensor and a comparison voltage, on the basis of the output voltage and the comparison voltage; and an AC current generation circuit which generates the output AC voltage having a frequency based on the phase difference instruction voltage, and generates the AC current having a frequency corresponding to the frequency of the output AC voltage, wherein the control circuit further has a plurality of magnetic sensors and an adder which adds up output signals from the plurality of magnetic sensors; and the phase detection circuit generates a phase difference instruction voltage corresponding to a phase difference between an output voltage from the adder and a comparison voltage, on the basis of the output voltage and the comparison voltage.

2. The wireless power feeder according to claim 1, wherein the phase delay circuit generates the delayed AC voltage in which the phase of the output AC voltage is delayed by less than 360° and not less than 30°.

3. The wireless power feeder according to claim 1, wherein the magnetic sensor is arranged such that a non-sensing direction forms an angle in a range of ±10° with respect to a magnetic field vector generated by the power feed coil.

4. The wireless power feeder according to claim 1, further comprising a magnetic shield member which has an approximate U shape in cross-section, and which magnetically shields five surfaces of the magnetic sensor, apart from a power receive coil side opposing surface which opposes the power receive coil, these five surfaces being a power feed coil side opposing surface which opposes the power feed coil and four side faces which intersect with the power receive coil side opposing surface and the power feed coil side opposing surface.

5. The wireless power feeder according to claim 1, wherein the phase detection circuit has:

a comparator which compares the output voltage from the magnetic sensor with the comparison voltage and generates a pulse voltage having a pulse width corresponding to the phase difference between the output voltage and the comparison voltage; and a low-pass filter which generates the phase difference instruction voltage by smoothing the pulse voltage.

6. The wireless power feeder according to claim 1, wherein the AC current generation circuit has:

a voltage-controlled oscillator which generates the output AC voltage having a frequency based on the phase difference instruction voltage; and a high-frequency amplifier which generates the AC current having a frequency corresponding to the frequency of the output AC voltage.

7. A wireless power transmission system which performs power transmission by a non-contact method between a wireless power feeder according to claim 1 and a wireless power receiver, wherein power transmission is performed from a power feed coil to a power receive coil on the basis of magnetic coupling between the power feed coil in the wireless power feeder and the power receive coil in the wireless power receiver.

8. The wireless power feeder according to claim 1, which performs power feed by a non-contact method to the wireless power receiver having a power receive resonance circuit including the power receive coil and a power receive capacitor, the wireless power feeder further comprising:

a power feed resonance circuit, including the power feed coil and the power feed capacitor, for performing power feed from the power feed coil to the power receive coil on the basis of a magnetic field resonance effect between the power feed coil and the power receive coil, wherein a resonance frequency of the power feed resonance circuit is associated with a resonance frequency of the power receive resonance circuit; and the control circuit associates the frequency of the AC current and the frequency of power receive resonance circuit.

9. The wireless power feeder according to claim 1, which performs power feed by a non-contact method to the wireless power receiver having a power receive resonance circuit including the power receive coil and a power receive capacitor, wherein the power feed coil does not substantially constitute a resonance circuit; and the control circuit performs power feed from the power feed coil to the power receive coil on the basis of a magnetic field resonance effect between the power feed coil and the power receive coil, by supplying AC current to the power feed coil, and associates a frequency of the AC current with a frequency of resonance current in the power receive resonance circuit.

10. A wireless power receiver which acquires power by a non-contact method from the wireless power feeder according to claim 8, the wireless power receiver comprising:

a power receive resonance circuit including a power receive coil and a power receive capacitor, for acquiring power from the power feed coil by the power receive coil, on the basis of a magnetic field resonance effect between the power feed coil in the wireless power feeder and the power receive coil;

a power receive load coil which receives the power fed from the power receive coil by a non-contact method; and an impedance converter, which is arranged between the power receive load coil and a load, an impedance of a primary side connected to the power receive load coil being higher than an impedance of a secondary side connected to the load.

11. A wireless power transmission system which performs power transmission by a non-contact method between the wireless power feeder and the wireless power receiver according to claim 10, wherein power transmission is performed from the power feed coil to the power receive coil on the basis of a magnetic field resonance effect between the power feed coil in the wireless power feeder and the power receive coil in the wireless power receiver.

12. The wireless power feeder according to claim 2, wherein the magnetic sensor is arranged such that a non-sensing direction forms an angle in a range of ±10° with respect to a magnetic field vector generated by the power feed coil.

13. The wireless power feeder according to claim 2, further comprising a magnetic shield member which has an approximate U shape in cross-section, and which magnetically shields five surfaces of the magnetic sensor, apart from a power receive coil side opposing surface which opposes the power receive coil, these five surfaces being a power feed coil side opposing surface which opposes the power feed coil and four side faces which intersect with the power receive coil side opposing surface and the power feed coil side opposing surface.

14. The wireless power feeder according to claim 2, wherein the control circuit further has a plurality of magnetic sensors and an adder which adds up output signals from the plurality of magnetic sensors; and the phase detection circuit generates a phase difference instruction voltage corresponding to a phase difference between an output voltage from the adder and a comparison voltage, on the basis of the output voltage and the comparison voltage.

15. A wireless power transmission system which performs power transmission by a non-contact method between a wireless power feeder according to claim 2 and a wireless power receiver, wherein power transmission is performed from a power feed coil to a power receive coil on the basis of magnetic coupling between the power feed coil in the wireless power feeder and the power receive coil in the wireless power receiver.

16. A wireless power receiver which acquires power by a non-contact method from the wireless power feeder according to claim 9, the wireless power receiver comprising:

a power receive resonance circuit including a power receive coil and a power receive capacitor, for acquiring power from the power feed coil by the power receive coil, on the basis of a magnetic field resonance effect between the power feed coil in the wireless power feeder and the power receive coil;

a power receive load coil which receives the power fed from the power receive coil by a non-contact method; and an impedance converter, which is arranged between the power receive load coil and a load, an impedance of a primary side connected to the power receive load coil being higher than an impedance of a secondary side connected to the load.

17. A wireless power feeder which performs power feed by a non-contact method to a wireless power receiver having a power receive coil, the wireless power feeder comprising:

a power feed coil; and a control circuit which performs power feed from the power feed coil to the power receive coil on the basis of magnetic coupling between the power feed coil and the power receive coil, by supplying AC current to the power feed coil, and which associates a frequency of the AC current with a frequency of current flowing in the power receive coil, wherein the control circuit has:

a phase delay circuit which generates a delayed AC voltage in which the phase of an output AC voltage is delayed;

a magnetic sensor which is biased by the delayed AC voltage and detects a magnetic field generated by the power receive coil;

a phase detection circuit which generates a phase difference instruction voltage corresponding to a phase difference between an output voltage from the magnetic sensor and a comparison voltage, on the basis of the output voltage and the comparison voltage; and an AC current generation circuit which generates the output AC voltage having a frequency based on the phase difference instruction voltage, and generates the AC current having a frequency corresponding to the frequency of the output AC voltage, wherein:

the phase delay circuit generates the delayed AC voltage in which the phase of the output AC voltage is delayed by less than 360° and not less than 30°;

the control circuit further has a plurality of magnetic sensors and an adder which adds up output signals from the plurality of magnetic sensors; and the phase detection circuit generates a phase difference instruction voltage corresponding to a phase difference between an output voltage from the adder and a comparison voltage, on the basis of the output voltage and the comparison voltage.

18. A wireless power feeder which performs power feed by a non-contact method to a wireless power receiver having a power receive coil, the wireless power feeder comprising:

a power feed coil; and a control circuit which performs power feed from the power feed coil to the power receive coil on the basis of magnetic coupling between the power feed coil and the power receive coil, by supplying AC current to the power feed coil, and which associates a frequency of the AC current with a frequency of current flowing in the power receive coil, wherein the control circuit has:

a phase delay circuit which generates a delayed AC voltage in which the phase of an output AC voltage is delayed;

a magnetic sensor which is biased by the delayed AC voltage and detects a magnetic field generated by the power receive coil;

a phase detection circuit which generates a phase difference instruction voltage corresponding to a phase difference between an output voltage from the magnetic sensor and a comparison voltage, on the basis of the output voltage and the comparison voltage; and an AC current generation circuit which generates the output AC voltage having a frequency based on the phase difference instruction voltage, and generates the AC current having a frequency corresponding to the frequency of the output AC voltage, the wireless power feeder further comprising a magnetic shield member which has an approximate U shape in cross-section, and which magnetically shields five surfaces of the magnetic sensor, apart from a power receive coil side opposing surface which opposes the power receive coil, these five surfaces being a power feed coil side opposing surface which opposes the power feed coil and four side faces which intersect with the power receive coil side opposing surface and the power feed coil side opposing surface.

\* \* \* \* \*